G. WASHINGTON.
PUMP.
APPLICATION FILED JULY 28, 1916.
1,258,835.
Patented Mar. 12, 1918.
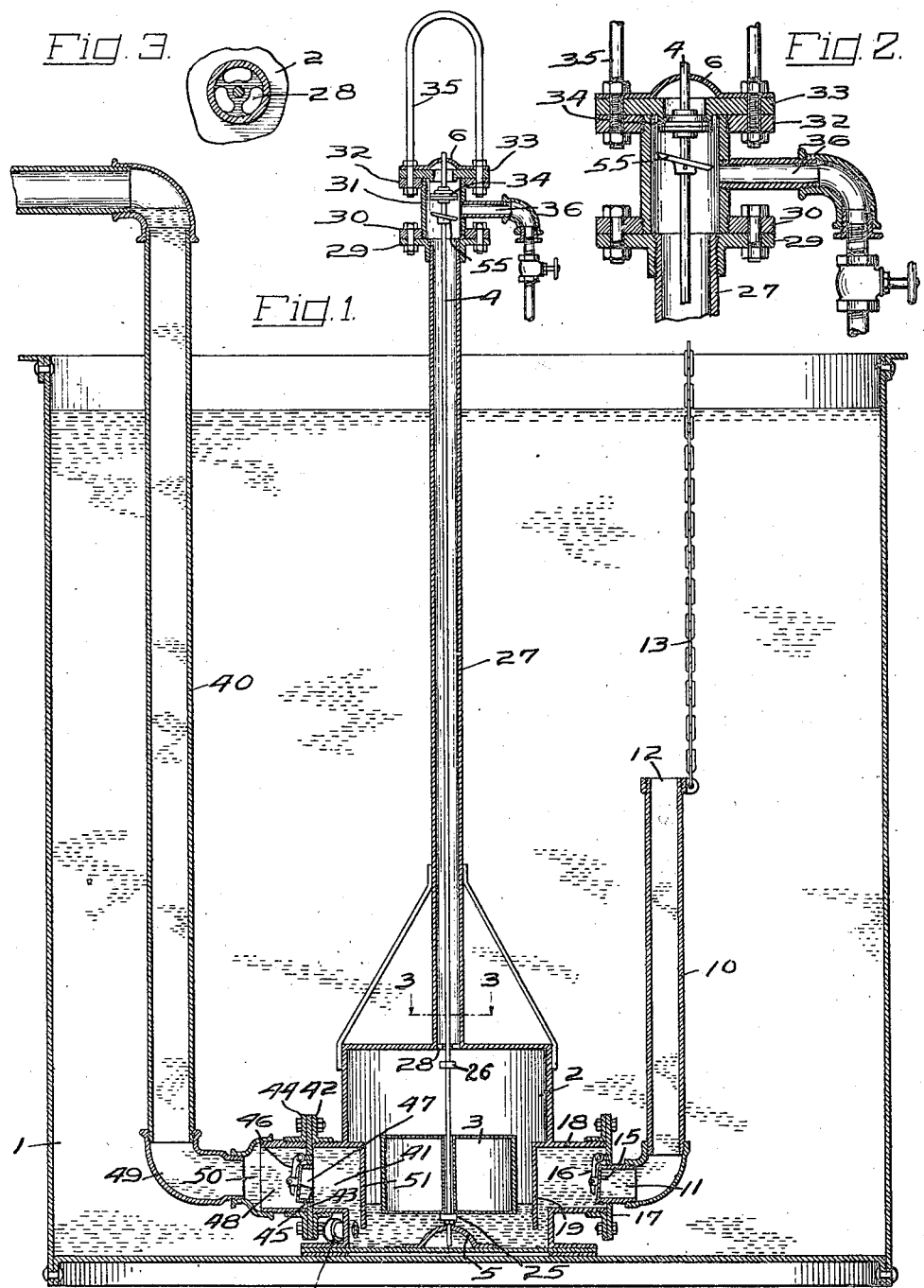
INVENTOR
George Washington
by
Owen, Owen & Crompton

UNITED STATES PATENT OFFICE.

GEORGE WASHINGTON, OF ANN ARBOR, MICHIGAN, ASSIGNOR TO ORVILLE S. BRUMBACK, TRUSTEE, OF TOLEDO, OHIO.

PUMP.

1,258,835.     Specification of Letters Patent.     Patented Mar. 12, 1918.

Application filed July 28, 1916. Serial No. 111,831.

*To all whom it may concern:*

Be it known that I, GEORGE WASHINGTON, a citizen of the United States, and a resident of Ann Arbor, in the county of Washtenaw and State of Michigan, have invented a certain new and useful Pump; and I do hereby declare the following to be a full, clear, and exact description of the invention, such as will enable others skilled in the art to which it appertains to make and use the same, reference being had to the accompanying drawings and to the characters of reference marked thereon, which form a part of this specification.

My invention relates to pumps, and is particularly adapted to pumping caustic liquids, especially the liquid commonly called "caustic" from which caustic soda is crystallized. The pump is formed of a material that will be acted the least upon by the caustic liquid which is lifted or operated upon by the pump.

When used in connection with caustic liquid I make its parts of iron or other material that is not so susceptible to the caustic as wood or other like material.

In the production of caustic soda for use in the arts under the present method, the liquid is boiled down and then ladled out of the boiling pots by hand, a process very expensive and dangerous to health and life. No ordinary pump can be used because of the extremely caustic action of the liquid.

The ladling causes the settlings in the boiling pots to be stirred up and spoils a large portion of the product. My invention enables the drawing off the caustic liquid without loss of purity and without injury to the eyes or person of operators. One element of my process is to draw the liquid into the pump above the line of the dregs or settlings in the boiling pot, and my pump is especially arranged to accomplish that end by air pressure.

Structures containing the invention may partake of different forms. I have selected one of such constructions as an example and shall describe it hereinafter.

The construction selected is illustrated in the drawings, wherein—

Figure 1 illustrates a sectional view of the pump and its connected parts. Fig. 2 illustrates an enlargement of the valve when closed. Fig. 3 illustrates a sectional view taken on the line 3—3 indicated in Fig. 1.

1, Fig. 1, is a vat for containing caustic soda. The pump and its parts are inserted in the vat and rest on the bottom thereof. 2 is a container having therein a float 3. The float 3 moves along the rod 4, which extends through the float and is secured in position by means of the U-member 6 located at the upper end of the pump above the surface of the liquid. The rod 4 is movable longitudinally in the U-members 5 and 6.

A pipe 10 is connected to the container 2. It is so connected that it may be rotated about the nipple 11 so as to elevate or depress the end 12 of the pipe 10, which forms the inlet to the container 2. I preferably use a chain 13 for altering the depth of the end 12 of the pipe 10. This will prevent the heavy liquid as settlings which form or collect at the bottom of the vat, from entering into the pump. The inner end of the nipple 11 is closed by means of a valve 15, which is secured to an arm 16. The arm 16 is pivoted to a plate 17, which closes the end of a boss 18 formed on the container 2. A baffle plate 19 is located in front of the valve 16 to cause the liquid to be directed to the bottom of the container 2 and to cause it to enter quietly into the container.

As the liquid enters the container 2 it raises the float 3, which moves upwardly along the rod 4. The rod 4 is provided with stops 25 and 26. As the float 3 rises by reason of its buoyancy when it reaches near the top of the container 2 it strikes the stop 26, whereupon the rod 4 is lifted.

The rod 4 extends upward through a pipe 27, which is connected to the top of the container 2. The interior of the pipe 27 communicates with the interior of the container 2 through openings 28. The upper end of the pipe 27 is provided with a flanged collar 29, to which is bolted a threaded ring 30. A short pipe or nipple 31 is threaded to the flanged collar 30. A threaded ring 32 is threaded onto the upper end of the nipple 31 and to this is bolted a plate 33 having a valve seat. If desired, a protecting yoke 35, formed of a threaded U-member, may be provided which may also be used for bolting the U-member 6 and the plate 33 to the collar 32. A pipe 36, which is connected with a source of air pressure supply, is connected to the nipple 31 below the valve 34.

When the valve 34 is raised by the operation of the float 3 so as to close the exit from the tube 27 and the nipple 31, the pressure of the air will then be transmitted to the surface of the liquid in the container 2. This closes the valve 15 and prevents the liquid from flowing out through the pipe 10. The pressure will force the liquid out through the pipe 40, which is connected to the container 2.

The container 2 is provided with a second boss 41, which is provided with a flanged collar 42, to which is secured a plate 43, and a second flanged collar 44. The plate 43 is located intermediate the two flanged collars 42 and 44. A valve 45 is connected to the arm 46, which is pivoted to the plate 43. The valve 45 opens outward and closes the opening 47 formed in the plate 43. A nipple 48 is threaded into the flanged collar 44 and to this the pipe 40 is connected by a suitable elbow 49 and a reducer 50. In front of the boss 41, that is, in front of the valve 45, is located a baffle 51, which extends to near the bottom of the container 2 so as to cause as much of the liquid of the container to be forced out through the pipe 40 as is desired, notwithstanding the fact that the top of the boss 41 in which the valve 45 is located is considerably above the bottom of the container 2.

As the liquid is forced out by the air pressure the float 3 moves downward along the rod 4 until the float 3 strikes the stop 25 and a sufficient quantity of the liquid contained in the container 2 is removed therefrom to cause the weight of the float 3 and the weight of the rod 4 to open the valve 34 notwithstanding the air pressure which is produced in the tube 27 and the container 2.

In order that the valve 34 may be opened wide and not be held in a balanced condition by reason of some of the air escaping through the valve opening and yet transmitting sufficient pressure to cause the liquid to remain at the low level and consequently hold the float 3 stationary, the upper end of the rod 4 is provided with the inclined plate 55, which is secured to the upper end of the rod below the valve 34. When the valve opens but slightly by the weight of the float 3 to allow but a portion of the air to escape through the valve, the lower portion of the deflector plate 55 is caught by the air current from the tube 36 and is driven downward by the air current which passes out through the valve opening. This causes the valve 34 to open wide and allow all of the air to escape, and reduce the pressure within the nipple 31, the pipe 27 and the container 2 to near that of the atmosphere. When the air pressure in the container 2 is reduced the liquid again flows through the pipe 10 and the valve 15 into the container 2, and the pressure of the liquid in the pipe 40 operates to close the valve 45, whereupon the container 2 is quickly refilled and the float lifted. This again closes the valve 34, and when the valve 34 is closed the pressure of the air supplied by the pipe 36 quickly causes the container 2 to discharge, and the liquid passes out through the valve 45 and the pipe 40. The operations thus repeat themselves in succession.

What I claim is:-

1. In a caustic pump, the combination of a container, a pipe revolubly connected with the container, a valve for allowing the liquid to enter the container through the pipe, means for varying the depth of the outer end of the pipe, a pipe connected to the container and having a valve for allowing the liquid to be ejected from the container through the last named pipe, baffle plates extending toward the bottom of the container and the front of the inlet and outlet communicating with the said pipes, and means for ejecting the liquid from the container by air pressure.

2. In combination with a vessel for containing liquid, a caustic pump having a container located in the vessel, the container having an inlet and an outlet valve, a baffle plate located in proximity to each valve, an adjustable means for controlling the depth of the liquid in the vessel at which the liquid is drawn out of the vessel, and means operating intermittently to supply air under pressure to the container to force the liquid out of the container.

In testimony whereof I have hereunto signed my name to this specification.

GEORGE WASHINGTON.

Copies of this patent may be obtained for five cents each, by addressing the "Commissioner of Patents, Washington, D. C."